(12) United States Patent
Hopkins et al.

(10) Patent No.: US 6,537,025 B2
(45) Date of Patent: Mar. 25, 2003

(54) APPARATUS FOR DIVERTING, REVECTORING AND ACCELERATING A FLOWING GAS MASS

(76) Inventors: Robert Seabrooke Hopkins, 77 Brodirick Road, Johnsonville, Wellington (NL); Gary Mark McGivney, 289 Flax Hill Rd., Norwalk, CT (US) 06854

( * ) Notice: Subject to any disclaimer, the term of this patent is extended or adjusted under 35 U.S.C. 154(b) by 0 days.

(21) Appl. No.: 09/784,264

(22) Filed: Feb. 15, 2001

(65) Prior Publication Data

US 2002/0110453 A1 Aug. 15, 2002

(51) Int. Cl.[7] .................................................. F01D 1/02
(52) U.S. Cl. ..................................... 415/202; 415/208.1
(58) Field of Search ........................... 415/80, 81, 202, 415/191, 208.1, 914

(56) References Cited

U.S. PATENT DOCUMENTS

| 356,634 | A | * | 1/1887 | Godfrey | 415/80 |
| 410,360 | A | * | 9/1889 | Ham | 415/80 |
| 4,115,028 | A | * | 9/1978 | Hintze | 415/2 |
| 4,295,783 | A | * | 10/1981 | Lebost | 415/4.4 |
| 5,009,569 | A | * | 4/1991 | Hector, Sr. et al. | 415/4.2 |
| 5,402,636 | A | * | 4/1995 | Mize et al. | 60/39.75 |

* cited by examiner

Primary Examiner—Edward K. Look
Assistant Examiner—Igor Kershteyn
(74) Attorney, Agent, or Firm—Kilgannon & Steidl (57) ABSTRACT

An apparatus for diverting, revectoring and accelerating a mass of gas, for example, a rapidly moving air mass traversing the landscape, wherein the apparatus comprises first and second spaced-apart upstanding walls, the first wall being disposed relative to the second wall such that the lower terminus of the first wall is disposed above the lower terminus of the second wall, thereby forming an entry inlet for high velocity air mass to pass between the walls and exit at the other end; the walls are disposed in a convergent rotation in the direction of the exit outlet of the apparatus and further, the upper terminus of the second wall being positioned relative to the upper terminus of the first wall such that an air mass flowing through the space between the first and second walls will exit the apparatus at an accelerated flow rate relative to the entry flow rate and with a vector divergent from the flow vector at the entry inlet and the walls being disposed.

24 Claims, 6 Drawing Sheets

APPARATUS FOR DIVERTING, REVECTORING AND ACCELERATING A FLOWING GAS MASS

BACKGROUND OF THE INVENTION

1. Field of the Invention

The present invention relates to an apparatus for diverting, revectoring and accelerating a moving gas, for example, a rapidly moving air mass.

2. Description of the Prior Art

An apparatus having a multiple wall configuration for deflecting jet exhausts is described in U.S. Pat. No. 5,429,334. Another apparatus for deflecting jet exhausts and deadening the sounds generated by the jet exhaust is described in U.S. Pat. No. 3,080,937.

Systems and apparatus for utilizing the power generated by passing high velocity gases against a working surface, such as a turbine blade, are described in U.S. Pat. Nos. 5,464,320; 5,350,273; 5,053,899; 5,009,569 and 4,624,104.

The use of apparatus to divert a moving air mass (wind) to enhance the performance of sailing vessels is described in U.S. Pat. Nos. 4,803,939 and 4,437,426.

SUMMARY OF THE INVENTION

Briefly, and in its broadest aspect, the apparatus of this invention comprises first and second spaced-apart upstanding walls, the first wall being disposed relative to the second wall such that the lower terminus of the first wall is disposed above the lower terminus of the second wall, thereby forming an entry inlet for high velocity gas to pass between the walls and exit at the other end; further, the walls are disposed in a convergent relation in the direction of the exit outlet of the apparatus and the upper terminus of the second wall is positioned relative to the upper terminus of the first wall so that a gas mass flowing through the space between the first and second walls will exit the apparatus at an accelerated flow rate relative to the entry flow rate and with a vector divergent from the flow vector at the entry inlet. The broadest aspect of the apparatus is described above and hereafter as if the second wall has its base resting on a horizontal surface. It should be understood that the method and apparatus and the relative spatial relationship of the first and second walls are applicable to the situation where the second wall moves through an upstanding position with the base of the second wall on a horizontal surface to a position where the second wall is parallel and contiguous to the horizontal surface.

In a preferred form, the rear face of the first wall is convexly and curvilinearly shaped and the front surface of the second wall is concavely and curvilinearly shaped.

In a more preferred form, the front surface of the first wall is concavely and curvilinearly shaped, together with the above indicated shape of the rear surface of the first wall and the front surface of the second wall.

In a further preferred form, in addition to the shapes set forth in the preceding two paragraphs, the rear surface of the first wall is aileron shaped, thus aiding in accelerating the gas mass flowing through the space between the walls.

In the most preferred form of the apparatus of this invention, in addition to the shapes described in the preceding three paragraphs, the second wall has a lip on the upper terminus of the second wall that is sloped toward the front wall. The tapered lip functions to thrust the accelerated air passing through the space between the first and second walls toward the prevailing air passing over the apparatus. This thrust action vectors the prevailing air upwards to increase the calm zone on the leeward side of the apparatus.

When the apparatus is used to divert wind and create an area of calm, the apparatus is positioned such that the first wall is facing in the direction of the high velocity wind and the second wall is standing on its base. The wind enters the space between the first and second walls and is vectored upwardly through the space at an increased speed and to exit the apparatus. The accelerated gas mass exiting the apparatus acts to divert the prevailing air in an upward direction, leaving the leeward side of the second wall relatively calm.

Further applications of the method and apparatus of this invention include directing wind into the sail of a vessel and also directing a flowing gas onto the turbine blades of a generator.

In using the apparatus of this invention to drive a turbine, the air directed through the apparatus is accelerated and pressurized, these parameters being maximized at the point of exit from the apparatus, whereat the turbine blades, mounted on a rotation shift, encounter the exiting air. The air moving along the front surface of the apparatus assists the exit speed of the air traversing the funnel of the apparatus by directing the prevailing airflow passing over the apparatus upward, thus effecting a relatively lower pressure zone at the exit port of the apparatus and causing the air exiting from the apparatus of the invention to increase in velocity as it approaches impingement on the turbine blades and, consequently, a greater driving force to the turbine blades.

Similarly, when using the apparatus of the invention to direct air traversing through the apparatus to a sail, the apparatus of the invention is mounted on the boom of the sailing vessel. Air passing through the funnel of the apparatus is accelerated and pressurized, reaching a maximum of these parameters at the exit port of the apparatus. The prevailing air passing over the front surface of the apparatus acts to direct prevailing air passing over the top of the apparatus in an upward direction, thus forming a zone of lower pressure at the exit port of the apparatus and thereby enhancing the acceleration of the air exiting the apparatus of the invention.

DETAILED DESCRIPTION OF THE INVENTION

Figure 2:
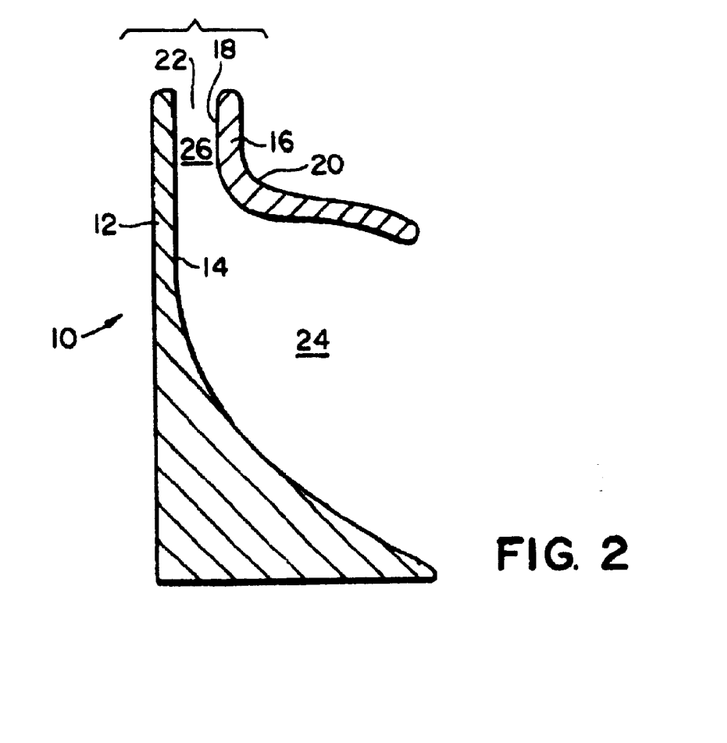
FIG. 2 is a cross-sectional view of the apparatus of FIG. 1.

In FIG. 2, the apparatus of this invention, generally designated as (10), has an upstanding second wall (12), the front or windward face (14) of the second wall (12) being concave and curvilinear in shape. Disposed forwardly of the second wall (12) is a first wall (16) having a convex and curvilinearly-shaped rear surface (18) and a concave and curvilinearly-shaped front surface (20). The second wall (12) and the first wall (16) are disposed relative to each other to create a space (22), which space (22) converges from the inlet zone (24) to the exit zone (26). The first wall (16) and the second wall (12) may be joined to each other by any standard support (not shown).

Figure 1:
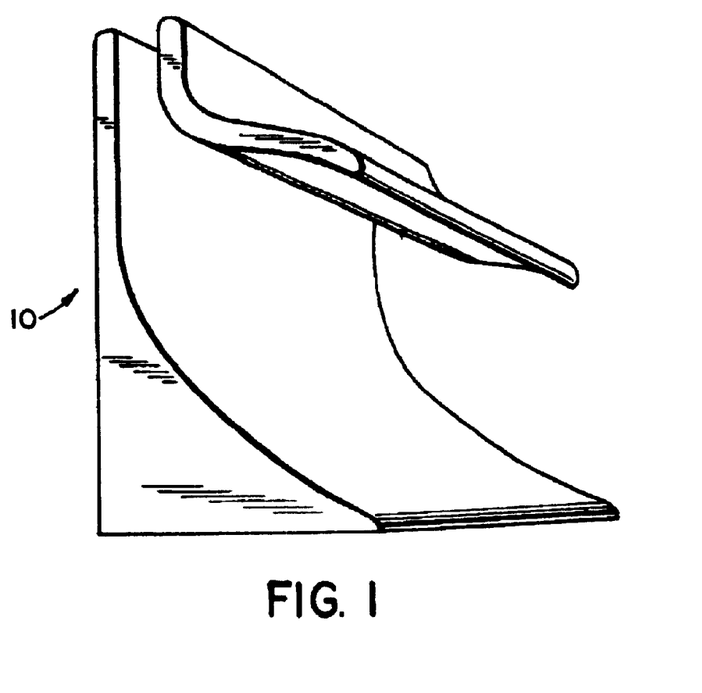
FIG. 1 is a perspective view of the apparatus of this invention.

As shown in FIGS. 1 and 2, the first wall has an airfoil shape such that the air traversing across the rear surface of the first wall is accelerated by having the air entering the space between the first and second walls travel a greater distance over the rear surface (18) of the first wall (16).

Figure 3:
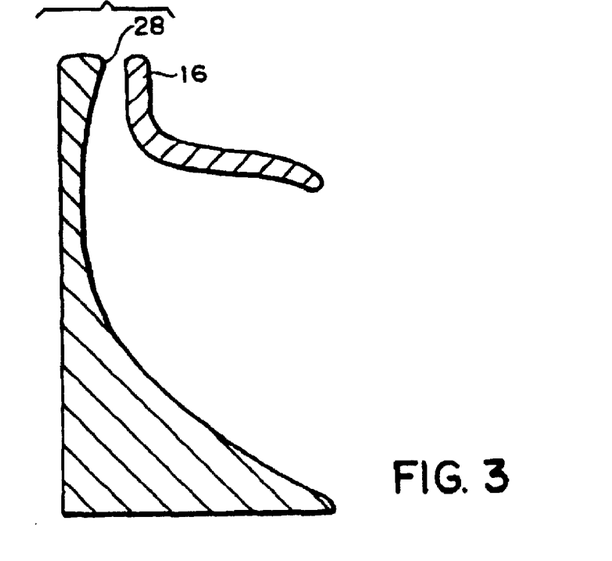
FIG. 3 is a cross-sectional view of a further embodiment of the apparatus of FIG. 2.

FIG. 3 shows a preferred embodiment of the apparatus of this invention, where the apparatus is utilized to create a zone of air calmness on the leeward side of the second wall. In FIG. 3, the top portion of the second wall has a lip (28) sloped toward the first wall (16). The lip (28) acts to direct the accelerated air passing between the first and second walls of the apparatus of the invention towards the prevailing air movement. This action directs the vectoring of the prevailing air in a further upward direction and creates a larger zone of calm air on the leeward side of the second wall. This aspect will be further discussed hereafter.

With the aforedescribed surface shapes of the first and second walls, the prevailing air is moved more efficiently between the walls of the apparatus and allows for the air to be directed in a new vector from the entry vector, while simultaneously minimizing air drag as it flows over the surfaces defining the space between the first and second walls, a curved surface is used on the rearward surface of the first wall and the front surface of the second wall; the rear surface of the first wall being convex and the front surface of the second wall being concave.

Figure 4:
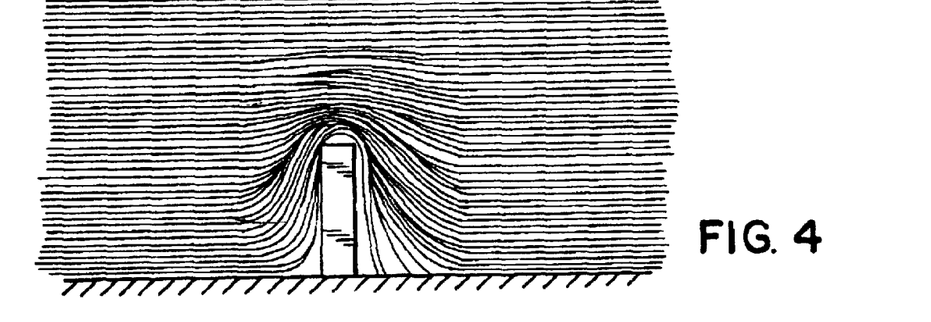
FIG. 4 is a depiction of air flow over the top and leeward side of a normal standing wall.
Figure 5:
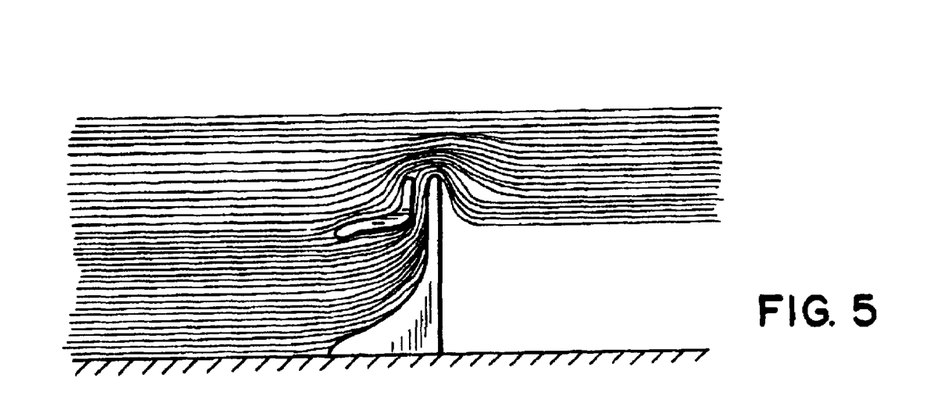
FIG. 5 is a depiction of air flow over the top and leeward side of the apparatus of the invention.

The use of the apparatus of this invention as a barrier to divert wind will create a zone on the leeward side of the barrier that will have a substantially increased zone of calmness as compared to the wind traversing into and over a regular upstanding wall. This improvement, namely, the creation of a zone of calm air on the leeward side of the barrier is illustrated in the depiction of wind vectors in FIGS. 4 and 5. It will be noted that with a standard upright wall, the wind velocity on the leeward side of the wall very rapidly intensifies a short distance after passing over the top of the barrier. While, as shown in FIG. 5, there is a substantial area of calm on the leeward side of the barrier of this invention. The wind velocity vectors are computer generated.

In utilizing the apparatus of this invention as a barrier, the terminus of the first and second walls at the exit port should be essentially coplanar for maximum efficiency.

In the instance where the apparatus is used to direct air into and onto a sail, the first or front wall is significantly lower than the second or rear wall for, in effect, the sail becomes an extension of the rear wall.

In the instance of utilizing the apparatus to drive a turbine, the upper terminus of the first or front wall may be slightly lower than the upper terminus of the second or rear wall for reason that the action of the turbine itself will redirect the air exiting between the walls of the apparatus away from the prevailing air through the rotational action of the turbine. Additionally, the venturi effect created by the increase in velocity of the air passing between the walls of the apparatus will draw air flowing over the front wall toward the higher velocity air passing between the walls of the apparatus and, thus, be drawn toward the turbine. The overall effect is beneficial to the desired rotation of the turbine.

Figure 6:
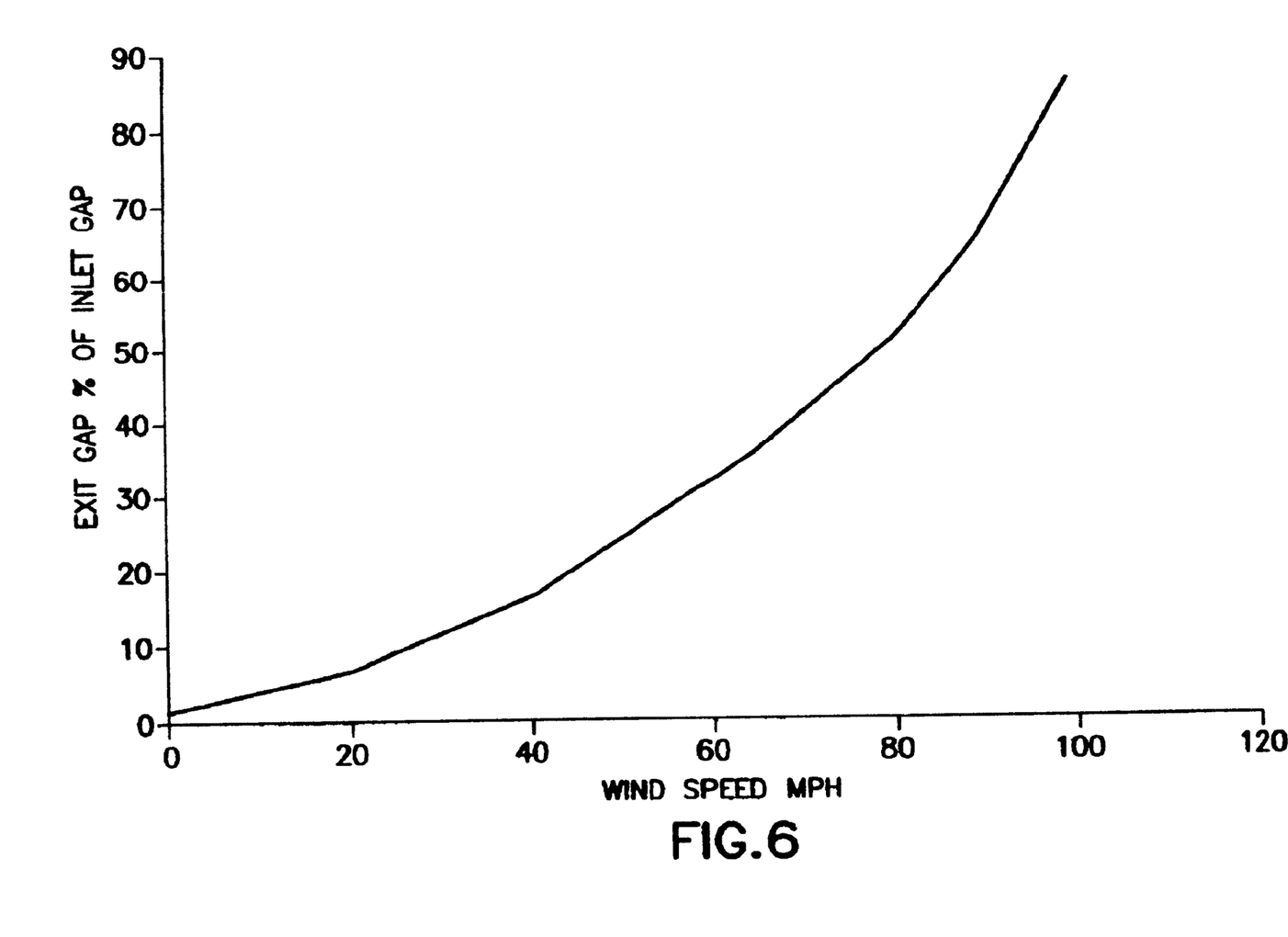
FIG. 6 is a graph setting forth the spacing of the outlet as a percentage of the inlet spacing at various wind velocities.
Figure 7A:
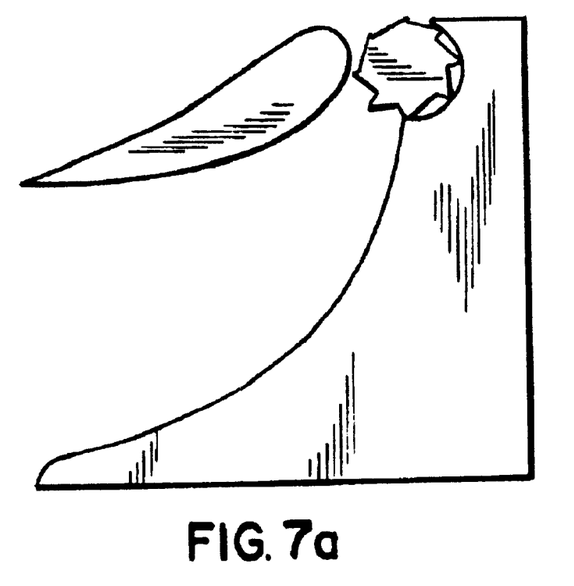
FIGS. 7a–7b are a schematic side view and a 30° isometric view of the apparatus of this invention as applied to driving a turbine.
Figure 7B:
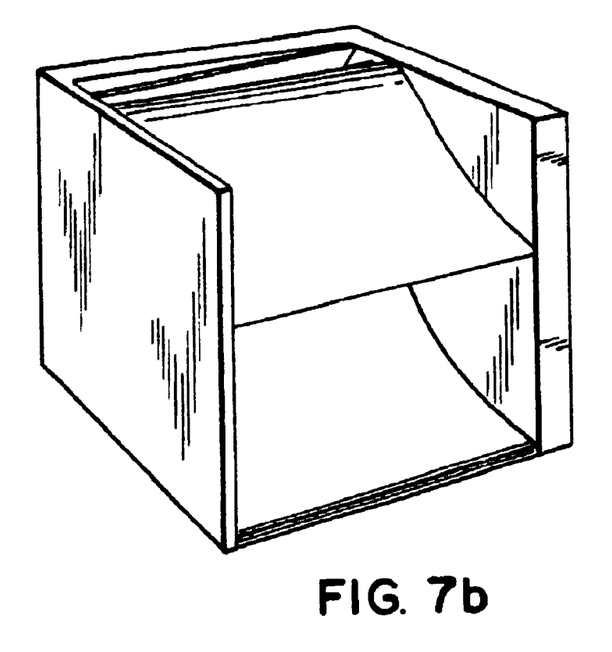
Figure 8A:
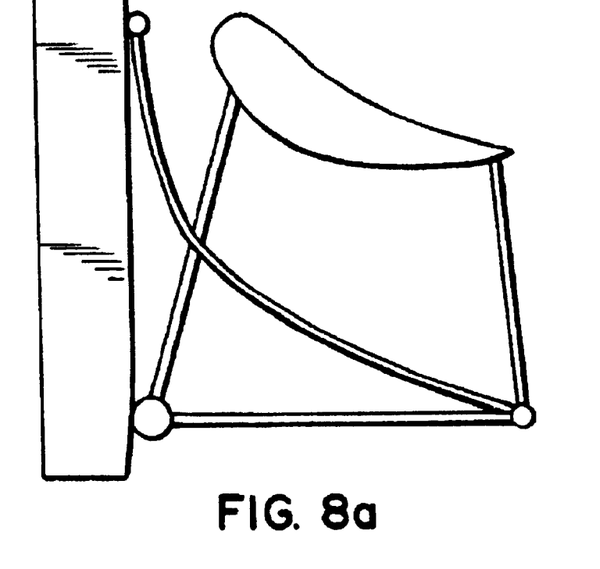
FIGS. 8a–8b are a schematic side view and an isometric view of the apparatus of this invention as applied to directing air to the sail of a sailing vessel.
Figure 8B:
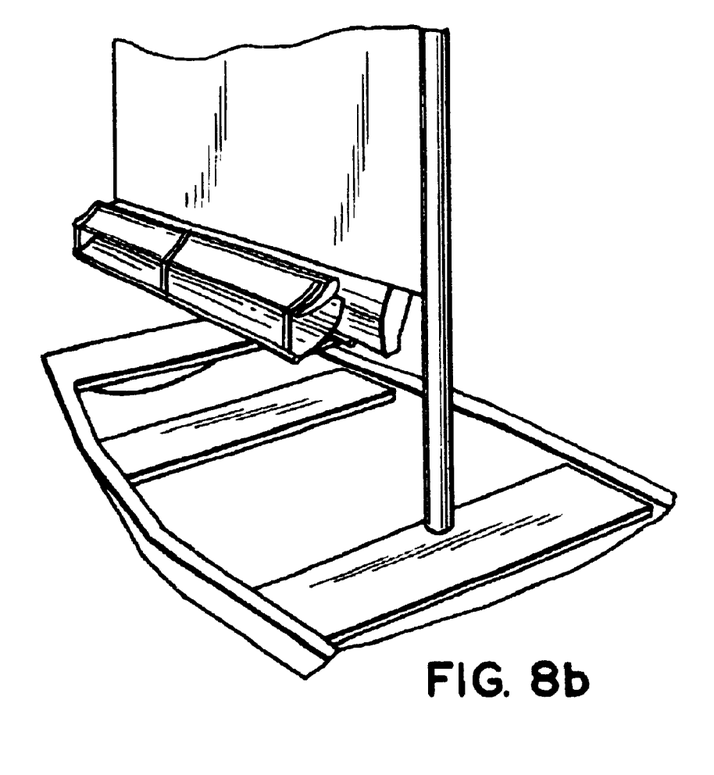

FIG. 6 discloses an approximation of the size of the outlet opening compared to the inlet opening for various wind velocities. It should be understood that the data set forth in FIG. 6 is a calculation based on a series of bench tests using a prototype barrier apparatus of this invention and wind velocities up to 45 m.p.h. by a controlled variable fan. Wind speed was determined by particulate movement over a set distance. Extrapolation was then made from the data generated to produce the curve of FIG. 6. The criteria for the curve of FIG. 6 was to note the greatest increase in exit velocity gained from modifying the exit gap relative to a set inlet gap. Of course, varying parameters such as the curve of either the first (front) or second (rear) wall or the type of foil used in the first wall modify the curve of FIG. 6. However, in all applications of the apparatus of this invention where the intent is to accelerate the air to maximum velocity at the exit port of the apparatus, the optimum values of the inlet/exit ports or gaps set forth in FIG. 6 will serve as a guide.

In the apparatus of this invention, the first and second wall may be mounted such that an adjustment in the spacing between the walls or elevationally one wall to the other wall may be made by means well-known to those skilled in the art.

The afore-described shape of the apparatus acts to funnel the prevailing air between the first and second walls, thereby accelerating the air through the exit port; the accelerated air exiting the apparatus providing an upward thrust to the prevailing air flowing over the top of the apparatus at the windward side and, thereby, increasing the area of calmness on the leeward side of the second wall. Additionally, the concave, curvilinear outer or windward face of the first wall deflects the prevailing air upward and protects the air passing between the first and second walls of the apparatus of this invention from interference and turbulence with the prevailing air.

While the apparatus is shown as standing with its base at ground level, it should be understood that the apparatus of the invention, in its use in creating an area of calm on the leeward side of the apparatus could be mounted atop an upstanding wall.

In the preferred form of the apparatus of this invention, the surfaces of the first wall are in the form of a half-parabola.

Figure 9:
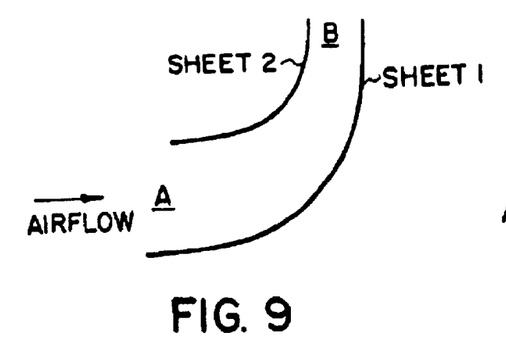
FIG. 9 is a schematic of the wind diverting apparatus of this invention using simple curvilinear shapes.
Figure 10:
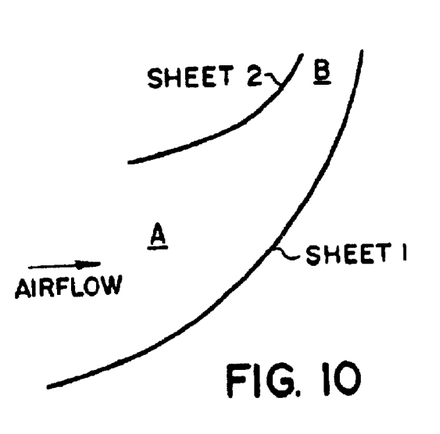
FIG. 10 is a schematic of the wind diverting apparatus of this invention using a more complex shape in the windward wall.

FIG. 9 is a schematic diagram of the apparatus of this invention employing simple curves for the first and second walls and FIG. 10 is a schematic of the device of the invention employing more complex parabolic curves for the first and second walls.

With the walls in the configuration of FIG. 9 and the air flow as indicated, the air enters at (A) between Sheet 1 and Sheet 2 and exits at (B); the curved Sheet 1 acting to funnel the air in a direction 90° from the horizontal, while Sheet 1 and Sheet 2 act to effect a pressurization and, consequently, an acceleration of the air flowing between the sheets.

Additionally, due to the concave, curvilinear outer surface of Sheet 2 facing in the path of the prevailing air, the air is moved in an upward direction. This upward or vertical movement of the prevailing air across the outer wall assists in having the upward vectored pressurized air moving between the sheets move to a greater vertical distance as it exits at (B) from the funnel.

To obtain a further improvement over the effects described in conjunction with the simple curves of FIG. 9, resort may be made to using semi-parabolic shapes for Sheets 1 and 2 as shown schematically in FIG. 10. The effect of using the shapes of FIG. 10 is to cause the entry angle for the air to be shallower and, thus, less drag and turbulence. Furthermore, because the nature of the parabolic curve is to tighten in radius as the curve moves toward its apex, the air passing between the sheets is more efficiently pressurized.

Figure 11:
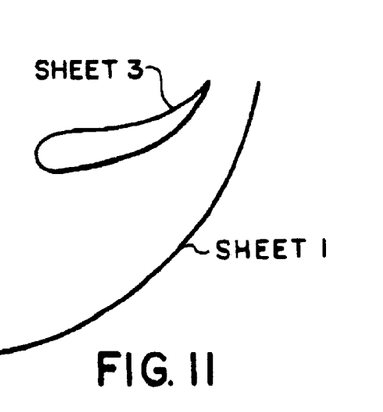
FIG. 11 is a schematic of the wind diverting apparatus of this invention showing a variant of Sheet 2 of FIG. 10.

To further improve the acceleration and throughput of the apparatus of this invention, Sheet 2 of FIG. 10 may be converted to the airfoil surface of Sheet 3 as shown in FIG. 11, thereby accelerating the air passing between Sheets 1 and 3.

Figure 12:
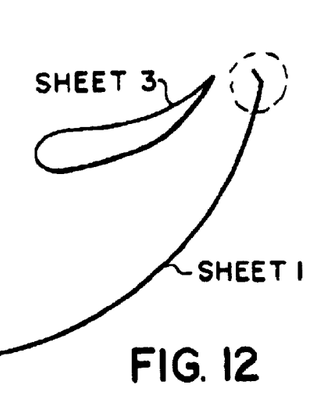
FIG. 12 is a schematic of the apparatus of FIG. 11 having an inwardly directed upper exit edge on Sheet 1.

As shown in FIG. 12, the upper edge of Sheet 1 may be sloped toward the prevailing air, with the consequence that the accelerated air is directed towards the prevailing air passing over and above the front surface of Sheet 3. This action increases the vectoring of the prevailing air passing upward over the front surface of Sheet 3 in an upward direction to a greater height to give a further improvement in the calmness of the zone beyond the apparatus.

While FIG. 12 shows Sheet 1 having an upper trailing edge deviating toward the prevailing wind, a similar deviation to leeward could be provided allowing the air in the space between the Sheets defining the funnel to escape sooner from the funnel. This structure would be useful when using the apparatus of this invention to direct prevailing air to a sail.

Figure 13:
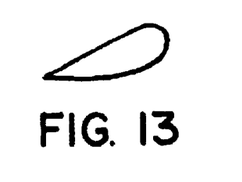
FIG. 13 is a variant of the schematic of Sheet 3 of FIG. 11.

While the windward or front surface of Sheet 2 or Sheet 3 in FIGS. 9–12 is shown as curvilinear, the said surface could be flat and smooth as shown in FIG. 13.

It is believed that the maximum efficiency of the apparatus is attained when the trailing edge of the first and second walls are coplaner, i.e., when the apparatus has the trailing edges of each of the first and second walls extending in a vertical direction to the same extent. It is further believed that a significant degree of calmness on the leeward side of the apparatus is attained where the coplanarity of the trailing edges of the first and second walls does not exceed ten (10) percent. Expectedly, where the coplanarity of the trailing edges of the first and second walls exceeds thirty (30) percent, there would be no improvement in the calmness on the leeward side of the apparatus. Further, it is expected that the afore-described planarity relationship would also apply where the apparatus of this invention is used to rotate turbine blades or as an assist in directing air to a sail.

Although specific examples of the invention have been shown for purposes of disclosure, it is to be understood that various modifications can be made therefrom without departing from the spirit and scope of the invention.

We claim:

1. An apparatus for diverting, revectoring and accelerating a flowing gas mass comprising an open-sided, forwardly and rearwardly disposed dual-wall assembly having a first wall with an upper portion and a base portion and a second wall with an upper portion and a base portion, said first wall having its base portion disposed above the base portion of the second wall, and said first and second walls being spaced from each other to provide, during flow of the gas mass through the space between the first and second walls, an entry inlet between their respective base portions for the aforesaid flowing gas mass and an exit outlet between their respective upper portions for the aforesaid flowing gas mass, the space between the first wall and the second wall converging in the direction of the exit outlet and the terminus of the upper portion of the second wall being positioned relative to the terminus of the upper portion of the first wall such that the aforesaid gas mass flowing through the space between the first and second walls will exit the apparatus at an accelerated flow rate relative the entry inlet flow rate and with a flow vector substantially divergent to the flow vector at the entry inlet.

2. The apparatus of claim 1, and further wherein the terminus of the upper portion of the second wall being positioned relative to the terminus of the upper portion the first wall such that the aforesaid gas mass flowing through the space between the first and second walls will exit the apparatus at the aforesaid accelerated flow rate relative the entry flow rate and with a vector substantially normal to the flow vector at the entry inlet.

3. The apparatus of claim 2, and further wherein the rear face of the first wall is convex and curvilinearly shaped and the front face of the second wall is concave and curvilinearly shaped.

4. The apparatus of claim 1, and further wherein the rear face of the first wall is convex and curvilinearly shaped and the front face of the second wall is concave and curvilinearly shaped.

5. The apparatus of claim 4, and further wherein the front face of the first wall is concave and curvilinearly shaped.

6. The apparatus of claim 3, and further wherein, the front face of the first wall is concave and curvilinearly shaped.

7. The apparatus as in any of the preceding claims, and further wherein the exit outlet is defined, in part, by the upper portion of the second wall being substantially in a common plane with the upper portion of the first wall.

8. (New) The apparatus as in any one of claims 1–6, and further wherein the upper portion of the second wall has a lip that is tapered toward the first wall.

9. (New) The apparatus as in any one of claims 1–6, and further wherein the exit outlet is defined, in part, by the upper portion of the second wall being substantially in a common plane with the upper portion of the first wall and the upper portion of the second wall has a lip that is tapered toward the first wall.

10. An apparatus for diverting, revectoring and accelerating high velocity gas flow to create a zone of calmness on the leeward side of the apparatus comprising an open-sided, forwardly and rearwardly disposed dual-wall assembly having a first wall with an upper portion and a base portion and a second wall with an upper portion and a base portion, said first wall having its base portion disposed above the base portion of the second wall, and said first and second walls being spaced from each other to provide, during flow of the gas mass through the space between the first and second walls, an entry inlet between their respective base portions for a flowing gas mass and an exit outlet between their respective upper portions for the flowing gas mass, the space between the first wall and the second wall converging in the direction of the exit outlet, the terminus of the upper portion of the second wall being positioned relative to the terminus of the upper portion of the first wall such that the aforesaid gas mass flowing through the space between the first and second walls will exit the apparatus at an accelerated flow rate relative the entry inlet flow rate and with a flow vector substantially normal to the flow vector at the entry inlet.

11. The apparatus of claim 10 and further wherein the rear face of the first wall is convex and curvilinearly shaped and the front face of the second wall is concave and curvilinearly shaped.

12. The apparatus of claim 10 and further wherein the front face of the first wall is concave and curvilinearly shaped.

13. The apparatus as in claims 10, 11 or 12 and further wherein the exit outlet is defined, in part, by the upper portion of the second wall being substantially in a common plane with the upper portion of the first wall.

14. The apparatus as in claim 13 and further wherein the upper portion of the second wall has a lip that is tapered toward the first wall.

15. An apparatus for diverting, revectoring and accelerating ambient air flow to a turbine for driving the turbine blades comprising directing the air flow to an open-sided, forwardly and rearwardly disposed dual-wall assembly having a first wall with an upper portion and a base portion and a second wall with an upper portion and a base portion, said first wall having its base portion disposed above the base portion of the second wall, and said first and second walls being spaced from each other to provide, during flow of the gas mass through the space between the first and second walls, an entry inlet between their respective base portions for a flowing gas mass and an exit outlet between their respective upper portions for the flowing gas mass, the space between the first wall and the second wall converging in the direction of the exit outlet, the terminus of the upper portion of the second wall being positioned relative to the terminus of the upper portion of the first wall such that the aforesaid gas mass flowing through the space between the first and second walls will exit the apparatus at an accelerated flow rate relative the entry inlet flow rate and with a flow vector substantially normal to the flow vector at the entry inlet.

16. The apparatus of claim 15 and further wherein the rear face of the first wall is convex and curvilinearly shaped and the front face of the second wall is concave and curvilinearly shaped.

17. The apparatus of claim 15 and further wherein the front face of the first wall is concave and curvilinearly shaped.

18. The apparatus as in claims 15, 16 or 17 and further wherein the exit outlet is defined, in part, by the upper portion of the second wall being substantially in a common plane with the upper portion of the first wall.

19. The apparatus of claim 18 and further wherein the upper portion of the second wall has a lip that is tapered toward the first wall.

20. An apparatus for diverting, revectoring and accelerating ambient air flow to a sailing vessel having a sail comprising directing the air flow to an open-sided, forwardly and rearwardly disposed, dual-wall assembly having a first wall with an upper portion and a base portion and a second wall with an upper portion and a base portion, said first wall having its base portion disposed above the base portion of the second wall, and said first and second walls being spaced from each other to provide, during flow of the gas mass through the space between the first and second walls an entry inlet between their respective base portions for a flowing gas mass and an exit outlet between their respective upper portions for the flowing gas mass, the space between the first wall and the second wall converging in the direction of the exit outlet, the terminus of the upper portion of the second wall being positioned relative to the terminus of the upper portion of the first wall such that the aforesaid gas mass flowing through the space between the first and second walls will exit the apparatus at an accelerated flow rate relative the entry inlet flow rate and with a flow vector substantially normal to the flow vector at the entry inlet.

21. The apparatus of claim 20 and further wherein the rear face of the first wall is convex and curvilinearly shaped and the front face of the second wall is concave and curvilinearly shaped.

22. The apparatus of claim 20 and further wherein the front face of the first wall is concave and curvilinearly shaped.

23. The apparatus as in claims 20, 21 or 22 and further wherein the exit outlet is defined, in part, by the upper portion of the second wall being substantially in a common plane with the upper portion of the first wall.

24. The apparatus of claim 23 and further wherein the upper portion of the second wall has a lip that is tapered toward the first wall.

* * * * *